US012500456B2

(12) United States Patent
Dumais et al.

(10) Patent No.: US 12,500,456 B2
(45) Date of Patent: Dec. 16, 2025

(54) FOREIGN OBJECT DETECTION AND RELATED APPARATUSES, METHODS, AND SYSTEMS

(71) Applicant: Microchip Technology Incorporated, Chandler, AZ (US)

(72) Inventors: Alex Dumais, Boise, ID (US); Santosh Bhandarkar, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 151 days.

(21) Appl. No.: 18/316,923

(22) Filed: May 12, 2023

(65) Prior Publication Data

US 2023/0369901 A1    Nov. 16, 2023

Related U.S. Application Data

(60) Provisional application No. 63/364,682, filed on May 13, 2022.

(51) Int. Cl.
*H02J 50/60* (2016.01)
*G01R 19/25* (2006.01)
*H02J 50/10* (2016.01)

(52) U.S. Cl.
CPC .......... *H02J 50/60* (2016.02); *G01R 19/2509* (2013.01); *H02J 50/10* (2016.02)

(58) Field of Classification Search
CPC . H02J 50/60; H02J 50/10; H02J 50/12; G01R 19/2509
See application file for complete search history.

(56) References Cited

U.S. PATENT DOCUMENTS

| 11,159,062 B2 | 10/2021 | Bhandarkar et al. |
| 11,764,621 B1* | 9/2023 | Hu .......................... H02J 50/80 307/104 |
| 2014/0354303 A1 | 12/2014 | Harrison |
| 2015/0123602 A1 | 5/2015 | Patino et al. |
| 2019/0068001 A1 | 2/2019 | Lovas et al. |
| 2019/0312466 A1 | 10/2019 | Mynar et al. |
| 2019/0312467 A1 | 10/2019 | Mynar et al. |
| 2021/0099016 A1* | 4/2021 | Bhandarkar ............ H02J 50/12 |

(Continued)

FOREIGN PATENT DOCUMENTS

KR    10-2016-0061837 A    6/2016

OTHER PUBLICATIONS

International Search Report for International Application No. PCT/US2023/066959, mailed Oct. 9, 2023, 6 pages.

(Continued)

*Primary Examiner* — Rexford N Barnie
*Assistant Examiner* — Rasem Mourad
(74) *Attorney, Agent, or Firm* — TraskBritt

(57) ABSTRACT

Foreign object detection and related apparatuses, methods, and systems are disclosed. An apparatus includes one or more inductive coils to wirelessly couple with another inductive coil, a series capacitor electrically connected in series with the one or more inductive coils, and a controller to determine a coil current through the one or more inductive coils responsive to a capacitor voltage potential difference across the series capacitor and determine a coil power responsive to the determined coil current and a coil voltage potential difference across the one or more inductive coils.

13 Claims, 14 Drawing Sheets

(56) References Cited

U.S. PATENT DOCUMENTS

| | | |
|---|---|---|
| 2021/0257862 A1* | 8/2021 | Muratov ................. H02J 50/60 |
| 2021/0281120 A1 | 9/2021 | Bhandarkar |
| 2022/0037933 A1 | 2/2022 | Bhandarkar et al. |
| 2022/0294270 A1 | 9/2022 | Bhandarkar |
| 2023/0024604 A1 | 1/2023 | Bhandarkar |
| 2023/0053186 A1* | 2/2023 | Tokaldani ............. H02J 50/005 |

OTHER PUBLICATIONS

International Written Opinion for International Application No. PCT/US2023/066959, mailed Oct. 9, 2023, 6 pages.

* cited by examiner

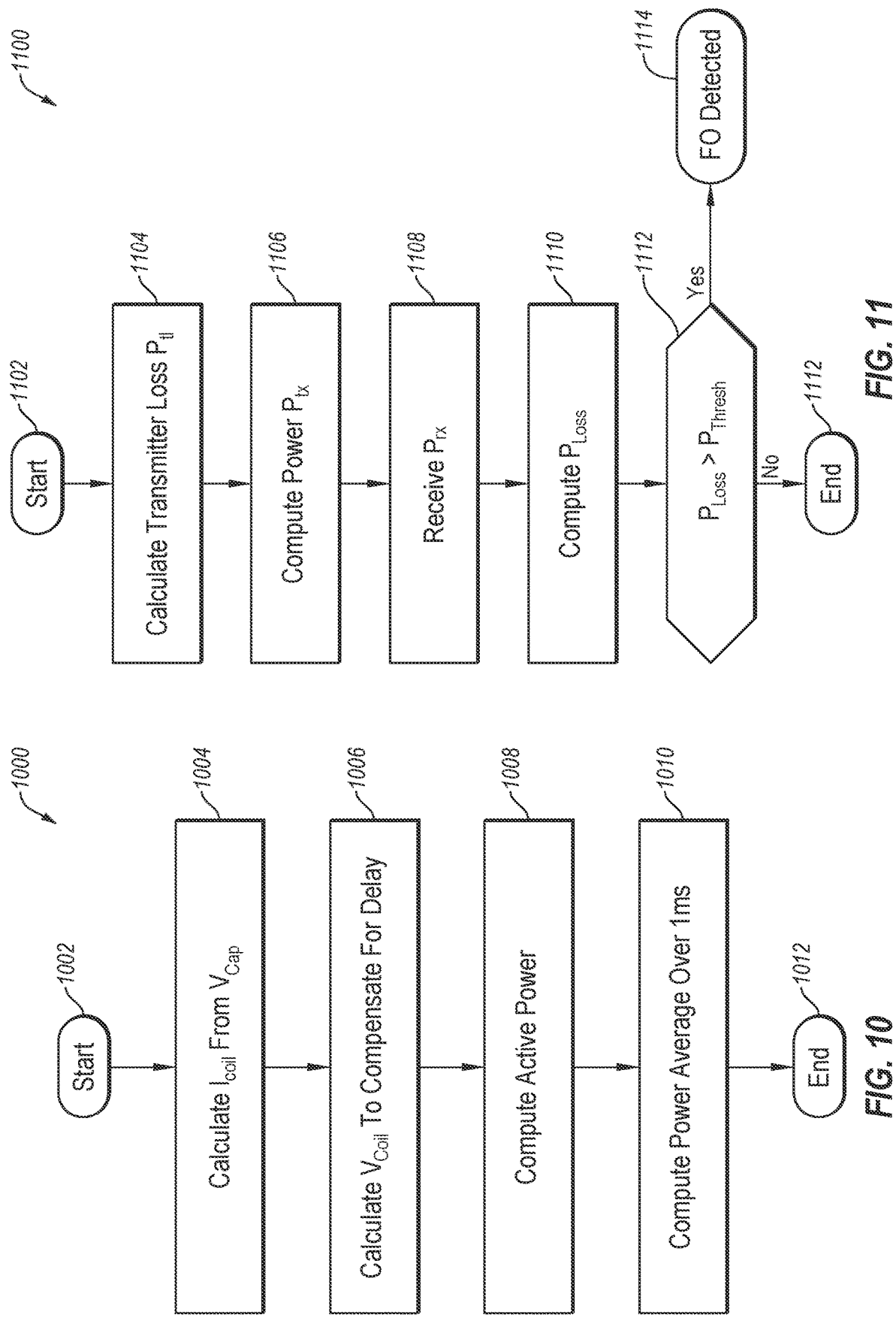

FOREIGN OBJECT DETECTION AND RELATED APPARATUSES, METHODS, AND SYSTEMS

CROSS-REFERENCE TO RELATED APPLICATION

This application claims the benefit of the priority date of U.S. Provisional Patent Application No. 63/364,682, filed May 13, 2022, and titled "FOREIGN OBJECT DETECTION AND RELATED APPARATUSES, METHODS, AND SYSTEMS," the disclosure of which is incorporated herein in its entirety by this reference.

TECHNICAL FIELD

This disclosure relates generally to foreign object detection proximate to one or more inductive coils, and more particularly to estimating a transmit power of one or more inductive coils responsive to a capacitor voltage potential difference of a series capacitor and a coil voltage potential difference of one or more inductive coils.

BACKGROUND

Wireless power transfer techniques are widely used to transfer power from one system to another in a wide range of applications. Qi is the most widely-adopted wireless charging standard and it has proliferated into nearly all consumer cell phone brands.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

FIGS. 8 through 12 are flowcharts of a detailed, end-to-end method of determining a coil power of a transmitter, according to one or more examples;

DETAILED DESCRIPTION

Figure 1:
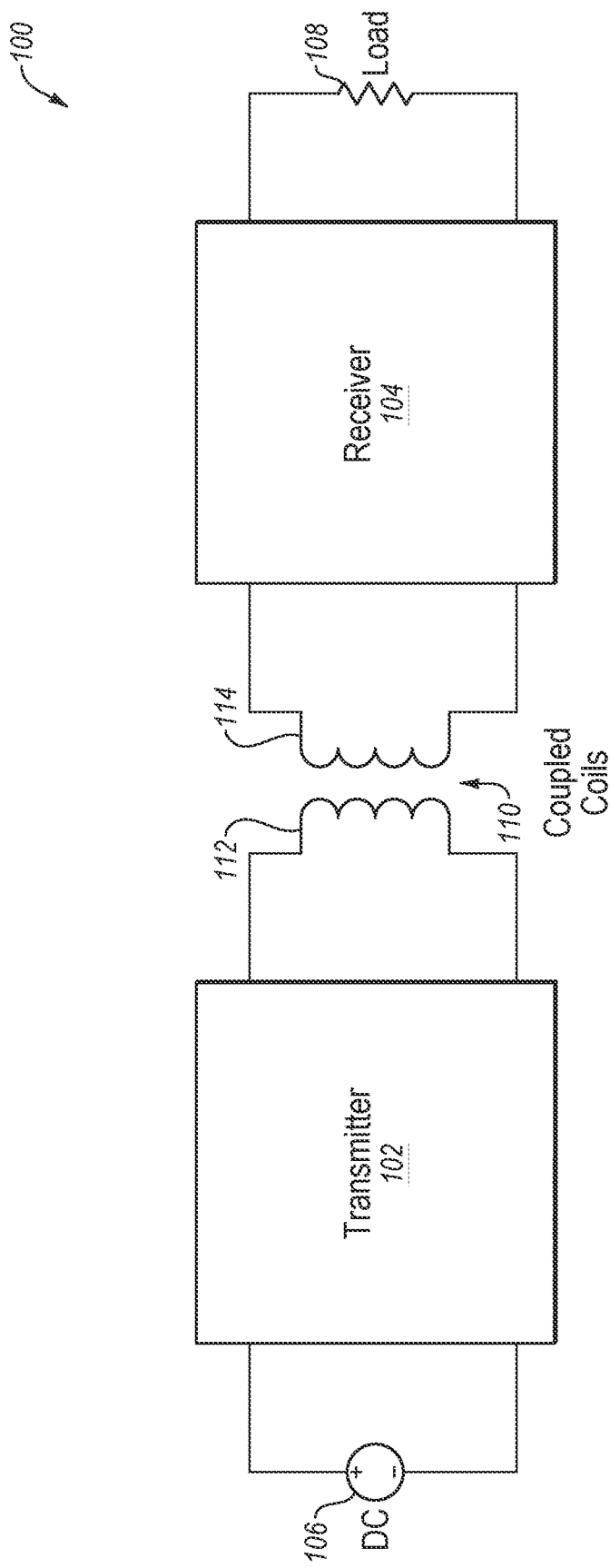
FIG. 1 is a block diagram of a wireless power system, according to various examples.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an examples or this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is to execute computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

A Qi wireless system includes a transmitter and a receiver. The transmitter controls the power transferred to the receiver based on the feedback received from the receiver. The transmitter includes at least one coil with which the receiver coil is coupled (e.g., inductively coupled) in a wireless system. In a multi-coil transmitter design, there are multiple transmitter coils overlapping each other so that the receiver coil may be placed on any of the transmitter coils. This provides spatial freedom for receiver placement and an approximate placement on the transmitter ensures power transfer. This contrasts with a single coil transmitter where the receiver coil should be properly aligned with the transmitter coil for power transfer.

One of the functions of the transmitter is to detect the presence of a foreign object (FO) in its vicinity. The Qi specification recommends using two methods for Foreign Object detection (FOD) namely Q and power loss. The Qi specification mentions using coil current to estimate the power transferred to the receiver at specific instants. At the same time, the receiver also measures the power it receives at its coil and sends the number back to the transmitter. The transmitter takes a difference between the power sent by the transmitter and a power received by the receiver to calculate the power loss. When a foreign object is present between the transmitter and receiver, the power loss numbers are higher than they would be without the foreign object present between the transmitter and receiver. If the power lost is beyond a limit (e.g., a predetermined threshold value) it may be determined that a foreign object is present. The power loss difference may thus be used to detect the foreign object. This method may be used to detect foreign objects independently of ever-changing configurations of transmitters.

The Qi power loss method recommends using a current sensor to measure the current through the coil and using the current sensor to estimate the losses in the transmitter. There are several losses in the transmitter from the point where the power loss is measured, which is typically on a direct current (DC) input to the H-bridge. The H-bridge metal oxide semiconductor field effect transistors (MOSFETs), the filter components, the coil change switches, and finally the coils themselves have resistance, which causes losses in these components. The power loss numbers may depend, at least in part, on several factors such as transmit coil to receive coil coupling ratio, transmit coil and receive coil inductance, components used in the transmitter, power measurement accuracy at the transmitter and receiver, among other factors. The foreign object detection is may be used to prevent overheating of the foreign object, which may lead to catastrophic failures and hazards.

Avoiding overheating of foreign objects in the automotive space may be helpful. The cost of implementing foreign object detection may be relatively high, though, given that current sensor-based foreign object detection may be relatively expensive. For example, coil current measurement may be performed using complex circuitry such as CT or hall effect sensors, which are not preferred in the automotive industry. In addition, current sensor-based foreign object detection may be sensitive to vibration, which may lead to component failures. Although coil voltage-based power estimation may rely on estimating power loss through the coil, such voltage-based power estimation methods may have limited accuracy.

Various example disclosed herein relate to evaluation of power loss under different conditions and without the use of a current sensor to detect foreign objects. Various examples disclosed herein may use low-cost hardware while providing a reliable power estimate. Various examples disclosed herein may reliably operate with multiple different transmitter topologies, multiple receivers, multiple transmitter to receiver coupling characteristics, multiple different output loads, and multiple input voltage potentials. Various examples disclosed herein involve estimating approximate power losses in a system based, at least in part, on calibration data. Various examples disclosed herein may reduce the need for calibration and provide accurate power measurement under various conditions.

According to one or more examples, a coil voltage potential and a capacitor voltage potential may be used in place of a coil current. The capacitor voltage potential may be used to derive current flowing through the capacitor by differentiating the capacitor voltage potential. Since the coil and the capacitor are electrically connected in series, the capacitor current is substantially the same as the current flowing through the coil. A capacitor current, and by extension a coil current, may be determined from the capacitor voltage potential on a sample-by-sample basis. The coil voltage potential may be measured simultaneously with the capacitor voltage potential.

In order to match the delays in the two channels, the average of the coil voltage potential may be considered. A dot product of the coil voltage potential and the capacitor current provides an active power across the transmitter coil. Active power may be computed based on the average coil voltage and coil current samples over several fundamental cycles (1-5). The resulting power thus computed may be an estimate of the power that is transmitted to a receiver.

The power may be averaged to determine the active transmitted power. Measurements may be taken by the transmitter and the receiver at predetermined intervals of time. Such intervals of time may be determined during protocol negotiations (e.g., 1 millisecond intervals of time). The receiver may send the power received at its end to the transmitter substantially once every second. The transmitter computes the difference between the power transmitted and the power received by the receiver. If this power loss exceeds a predetermined threshold value, it may be determined that a foreign object is present.

In some examples an estimate for the transmitter power may be computed every millisecond, when a receiver is placed on the transmitter and the transmitter phase proceeds to power transfer. Once the power supplied to the receiver is known at a given instant, the power loss may be computed by subtracting the receiver power number shared by the receiver at the same instant. The power loss number is compared with a predetermined threshold value to determine whether and foreign objects present. If a foreign object is present, the power loss number may be large compared to the power loss number without the foreign object present because as the transmitter supplies its own loss, the receiver and the foreign object also both contribute to additional loss. This leads to a larger power loss number than if the foreign object was not present. When a foreign object is detected the transmitter may stop supplying power to the receiver to avoid heating the foreign object and to avoid wasting power.

In some examples various examples disclosed herein may ensure that the transmitter power loss matches at different control variable points that depend on the transmitter to receiver coupling, receiver load, and receiver output voltage potential. Also, various examples disclosed herein may work with multiple receiver designs (e.g., substantially 165). If the power loss numbers are not accurate, there could be false trips due to absence of a foreign object, or the transmitter may fail to stop power in the presence of a foreign object.

Various examples disclosed herein may provide for accurate computation of active power independently of a transmitter configuration, reduce or remove a need for calibration for a given design, eliminate a need for a coil current sensing circuitry at the transmitter, enable reliable detection of foreign objects at the transmitter with multiple receivers and varying load conditions, and may be implemented using simple, low-cost hardware.

According to various examples, a foreign object may be detected by, using simple hardware, sensing a transmitter coil voltage potential, sensing a series capacitor voltage potential, receiving, from a wireless power receiver, an indication of a received power. The coil current may be estimated (e.g., using a software and/or a hardware implementation), the transmitter coil active power may be computed, and a power difference between the transmitted power and the received power may be computed (e.g., at regular intervals). A power loss beyond a threshold indicates presence of a foreign object (e.g., if the power difference is greater than a predetermined threshold value).

Various examples disclosed herein may be implemented by wireless power transmitters. Various examples disclosed herein may, however, also be implemented in other situations that involve object detection.

According to various examples, a low-cost solution may be used to detect presence of foreign objects proximate to a transmitter coil (e.g., on a transmitter surface) when the receiver is present. Power transmitted by the transmitter coil may be accurately computed using samples of coil voltage potentials and series capacitor voltage potentials (e.g., samples acquired via a differential amplifier circuit). The estimated power transmitted by the transmitter coil may be compared with the power received by the receiver, and when the power loss is beyond a threshold, a determination may be made that a foreign object is present between the transmitter coil and a receiver coil. Various examples may be implemented using minimum hardware on board, and reliable performance under multiple dynamic conditions may be achieved.

FIG. 1 is a block diagram of a wireless power system 100, according to one or more examples. Wireless power system 100 includes a transmitter 102 and a receiver 104. Transmitter 102 is powered by a DC voltage source 106, and receiver 104 is connected to a load 108. The power is transferred from transmitter 102 to receiver 104 through a set of coupled coils 110 (i.e., from a transmitter coil 112 to a receiver coil 114). Transmitter 102 controls the power transferred by controlling the input voltage, frequency, phase, and/or duty cycle of the signal applied to transmitter coil 112. Power is transferred by magnetic flux linkage; there is no physical connection between transmitter 102 and receiver 104. The power transmission is efficient when transmitter and receiver coils 112 and 114 are placed one over the other and are aligned.

Figure 2:
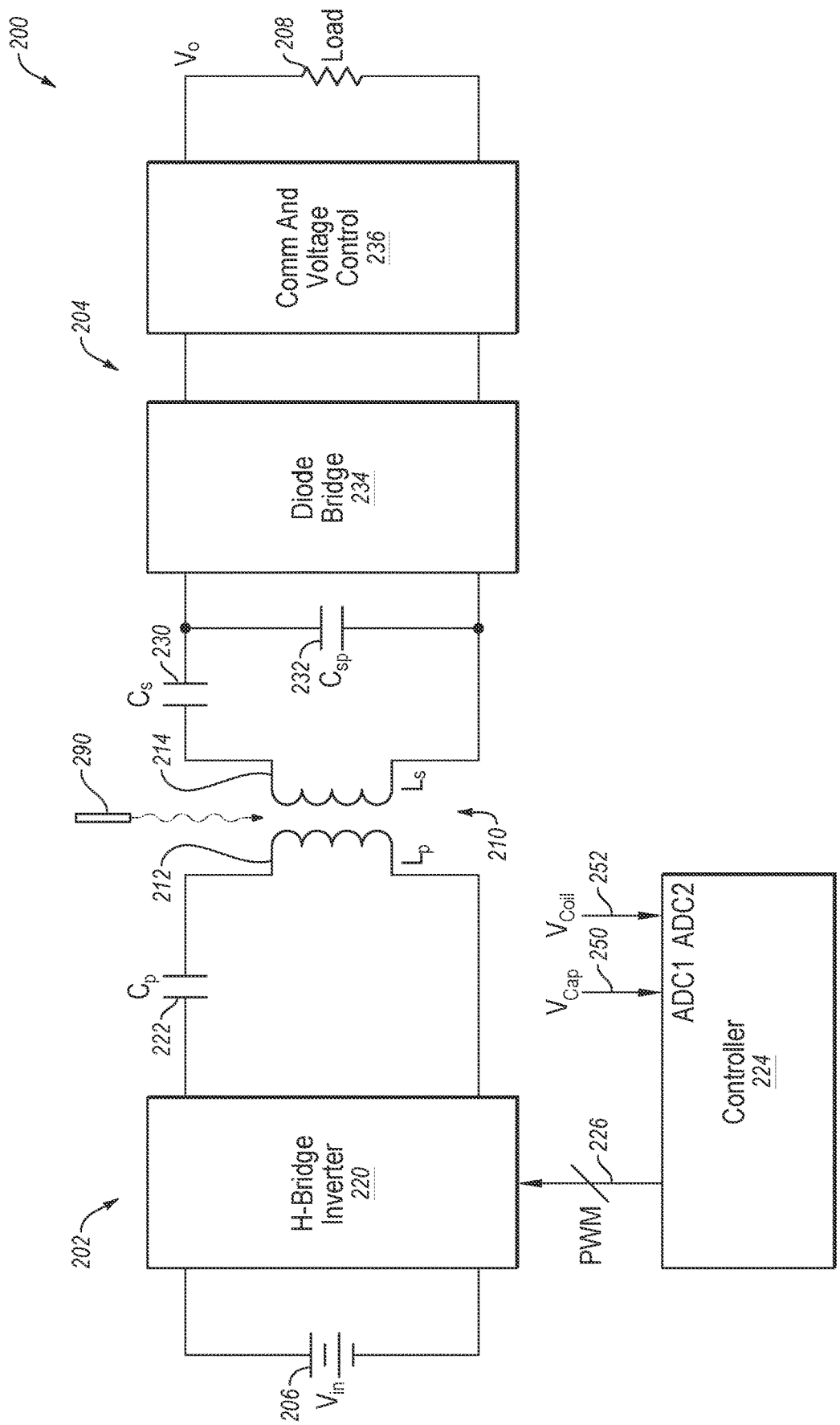
FIG. 2 is a schematic block diagram of a wireless power system, according to one or more examples.

FIG. 2 is a block diagram of a wireless power system 200 without a power filter, according to one or more examples. Like the wireless power system of FIG. 1, wireless power system 200 of FIG. 2 includes a transmitter 202 and a receiver 204. In one or more examples, transmitter 202 is included as part of a first device and receiver 204 is included as part of a second device, where the second device is separate and apart from the first device (e.g., the second device may be movable and relocatable independent of the first device).

Transmitter 202 is powered by a DC voltage source 206, and receiver 204 is connected to a load 208. In general, power is transferred from transmitter 202 to receiver 204 through a set of coupled coils 210 (i.e., from a transmitter coil 212 ($L_p$) of transmitter 202 to a receiver coil 214 ($L_s$) of receiver 204).

Transmitter 202 includes an H-bridge inverter 220 and a capacitor 222 ($C_p$) electrically connected in series with transmitter coil 212. Capacitor 222 may be referred to as a "transmitter tank capacitor" and more generally as a "series capacitor." A controller 224 may drive H-bridge inverter 220 with pulse-width modulated (PWM) signals 226 or pulses. In one or more examples, controller 224 may be a microcontroller, such as a dsPIC microcontroller, without limitation. In one or more examples, the PWM signals 226 may be either a fixed frequency or a variable frequency, which may depend on the particular topology of transmitter 202.

Receiver 204 includes a capacitor 230 ($C_s$), a capacitor 232 ($C_{sp}$), a bridge rectifier 234 (diode bridge), and communication and voltage control circuitry 236. Capacitor 230 is electrically connected in series with receiver coil 214, and capacitor 232 is electrically connected in parallel with the series-connected capacitor 230 and receiver coil 214. Capacitor 230 ($C_s$) may be referred to as a "receiver tank capacitor" and more generally as a "series capacitor." A resonant tank circuit is formed by receiver coil 214 and capacitors 230 and 232. The output of the resonant tank circuit is passed through bridge rectifier 234, which rectifies the voltage. The output of bridge rectifier 234 is passed through either a buck converter or a low-dropout (LDO) regulator, which provides a fixed voltage at load 208.

As described herein, transmitter 202 is operative to determine whether a foreign object 290 is present between transmitter coil 212 and receiver coil 214. In one or more examples, controller 224 may compute a coil power of transmitter 202, which may be used for computing a power loss for detection of foreign object 290. For this purpose, controller 224 provides an input 250 to a first analog-to-digital converter (ADC) channel for sampling a capacitor voltage across capacitor 222 ($C_p$). A coil current may be computed based on the sampled capacitor voltages. Note that, as capacitor 222 is coupled in series with transmitter coil 212, the current through capacitor 222 is the same as the coil current. In addition, controller 224 provides an input 252 to a second ADC channel for sampling a coil voltage across transmitter coil 212 ($L_p$).

The computation of the coil power based on the above-obtained signals is described in more detail below (e.g., FIGS. 8-12, FIG. 13). In one or more examples, transmitter 202 may determine whether foreign object 290 is present without use of a conventional current sensor to measure the current through transmitter coil 212 and/or to estimate losses in transmitter 202.

Figure 3:
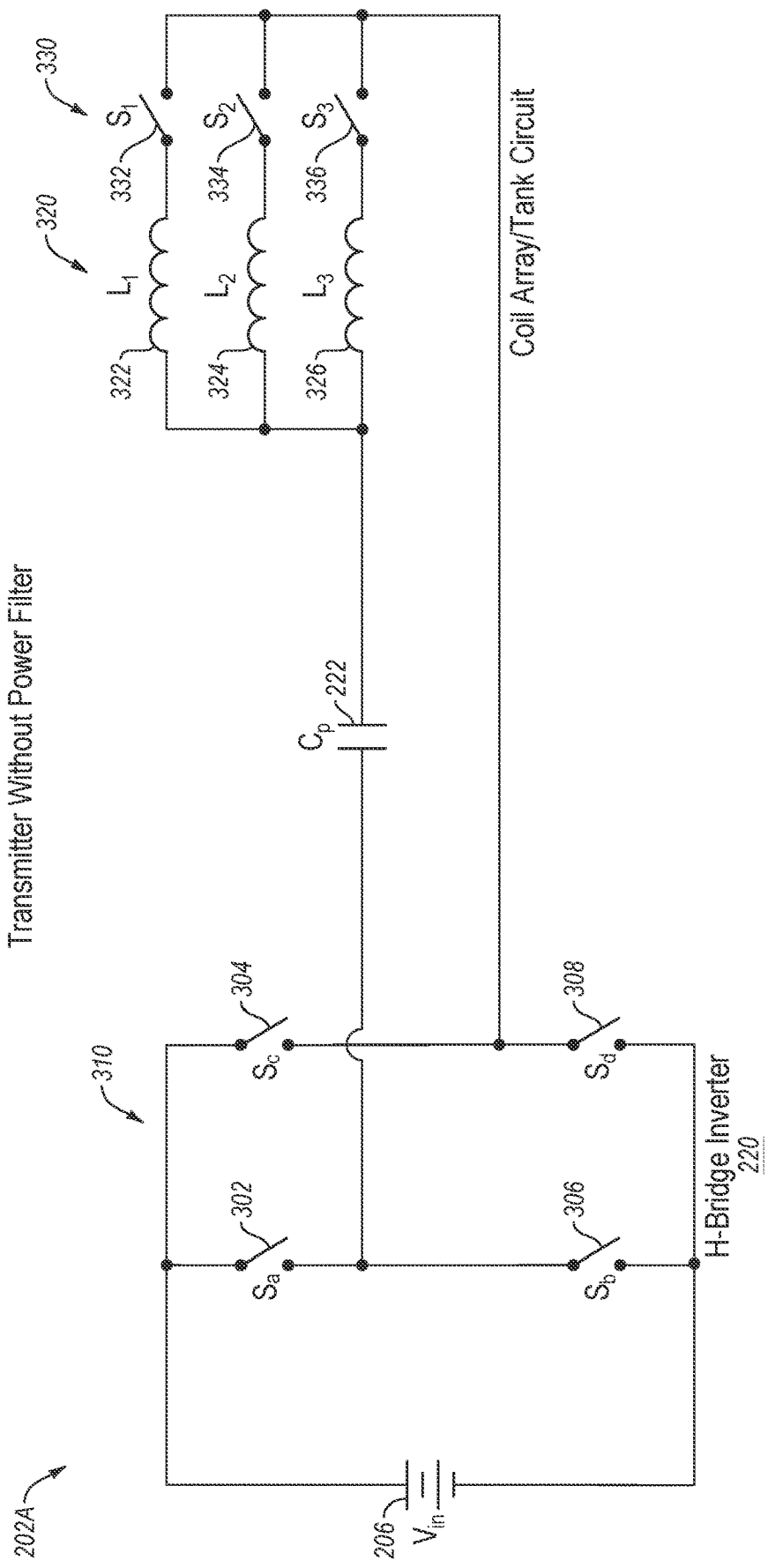
FIG. 3 is a circuit schematic diagram of a transmitter without a power filter, according to one or more examples.

FIG. 3 is a circuit schematic diagram of a transmitter 202A without a power filter, according to one or more examples. Transmitter 202A of FIG. 3 illustrates transmitter hardware which may be used as transmitter 202 of FIG. 2. As shown in FIG. 3, transmitter 202A is a multi-coil transmitter.

H-bridge inverter 220 comprises multiple switches 310 including switches 302, 304, 306, and 308 (designated $S_a$, $S_b$, $S_c$, and $S_d$, respectively). In one or more examples, switches 302, 304, 306, and 308 are MOSFETs driven by MOSFET drivers. The controller (e.g., controller 224 of FIG. 2) may control of operation of H-bridge inverter 220. More specifically, the MOSFET driver inputs may be operably coupled to and/or controlled by PWM pins on the controller. In operation, switches 302 and 308 are turned on in the positive half cycle, and switches 304 and 306 are turned on in the other half cycle. In one or more examples, the frequency of operation may be fixed at 125 kHz for the selected topology.

Transmitter 202A includes a coil array 320 of multiple coils 322, 324, and 326 (designated $L_1$, $L_2$, and $L_3$, respectively). Multiple switches 330 include switches 332, 334, and 336. Respective coils 322, 324, and 326 of coil array 320 are coupled in series with a respective one of switches 332, 334, and 336 (designated $S_1$, $S_2$, and $S_3$, respectively).

Capacitor 222 has a first end coupled between switches 302 and 306 and a second end coupled to ends of coils 322, 324, and 326. A resonant tank circuit may be formed by capacitor 222 ($C_p$) and a selected one of coils 322, 324, and 326 connected across an output of H-bridge inverter 220. The input to H-bridge inverter 220 may come directly from the source or from an output of a four-switch buck boost converter (FSBBC), which controls the input voltage to H-bridge inverter 220.

H-bridge inverter 220 applies an AC voltage across the resonant tank circuit formed by capacitor 222 and the selected one of coils 322, 324, and 326. When one of switches 332, 334, and 336 is closed, it places a respective one of coils 322, 324, and 326 in the resonant tank circuit (only one of coils 322, 324, and 326 is connected to H-bridge inverter 220 at a time). In one or more examples, switches 332, 334, and 336 may be made of back-to-back MOSFETs for conducting bidirectional AC current in the resonant tank circuit. These switches may be controlled by the controller and may be switched as described.

Figure 4:
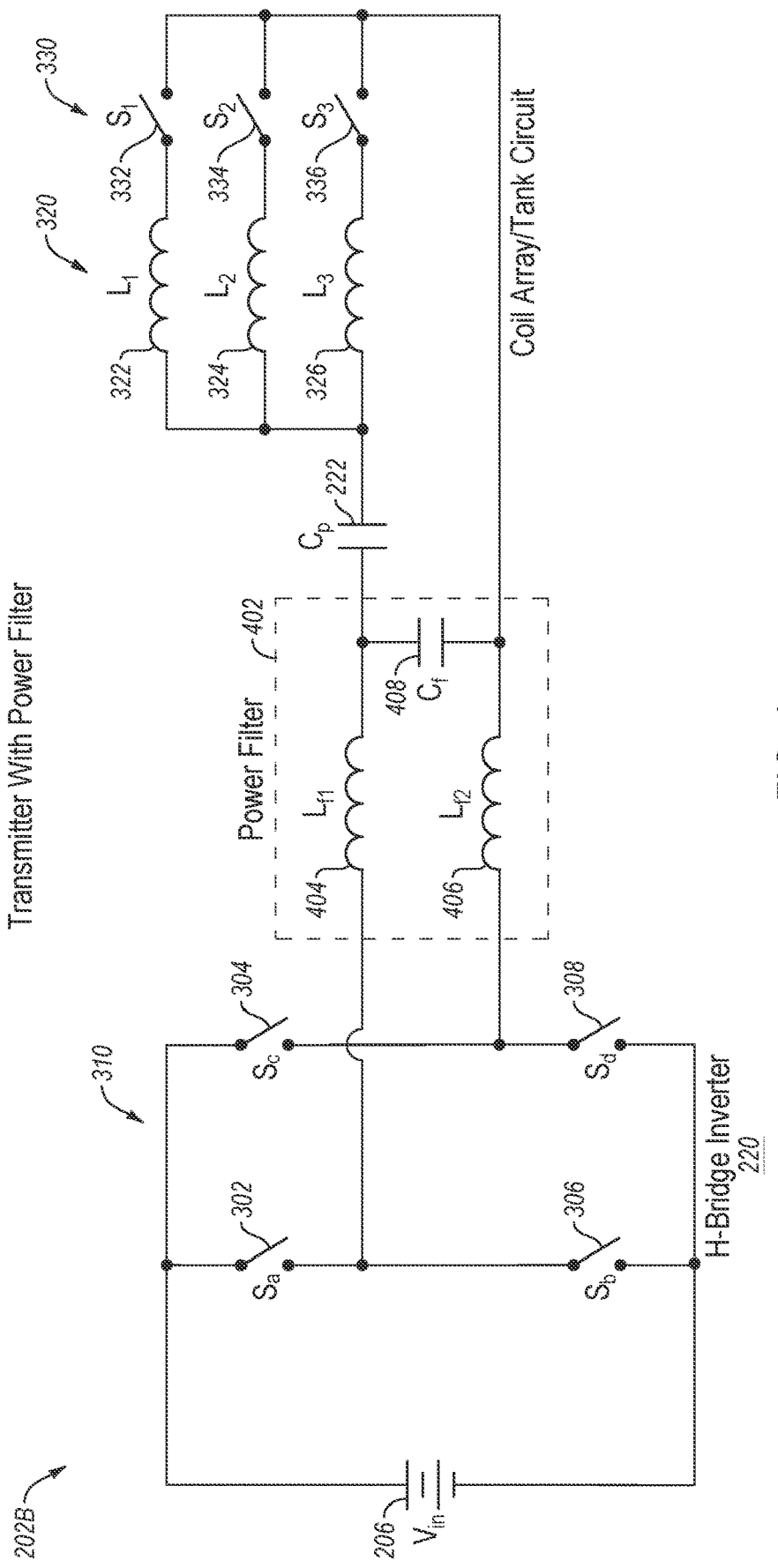
FIG. 4 is a circuit schematic diagram of a transmitter including a power filter, according to one or more examples.

FIG. 4 is a circuit schematic diagram of a transmitter 202B including a power filter 402, according to one or more examples. Transmitter 202B of FIG. 4 is the same as the transmitter of FIG. 3 but includes power filter 402. Transmitter 202B of FIG. 4 may be used as transmitter 202 of FIG. 2.

Power filter 402 includes an additional LC filter between H-bridge inverter 220 and the resonant tank circuit. Power filter 402 includes an inductor 404 ($L_{f1}$), an inductor 406 ($L_{f2}$), and a capacitor 408 ($C_f$). Inductor 404 is coupled in series with capacitor 222 and has an end coupled between switches 302 and 306. Inductor 406 has a first end coupled between switches 304 and 308 and a second end coupled to ends of switches 332, 334, and 336. Capacitor 408 has a first end coupled between capacitor 222 and inductor 404 and a second end coupled to the second end of inductor 406.

The resonant frequency of power filter 402 is much higher than the resonant frequency of the resonant tank circuit. Power filter 402 is included to apply only the fundamental switching frequency to the resonant tank circuit. Without power filter 402, a square wave waveform including a fundamental frequency and odd harmonics would be applied to the resonant tank circuit. Power filter 402 reduces high frequency electromagnetic (EM) radiation from being produced from transmitter 202B.

Figure 5:
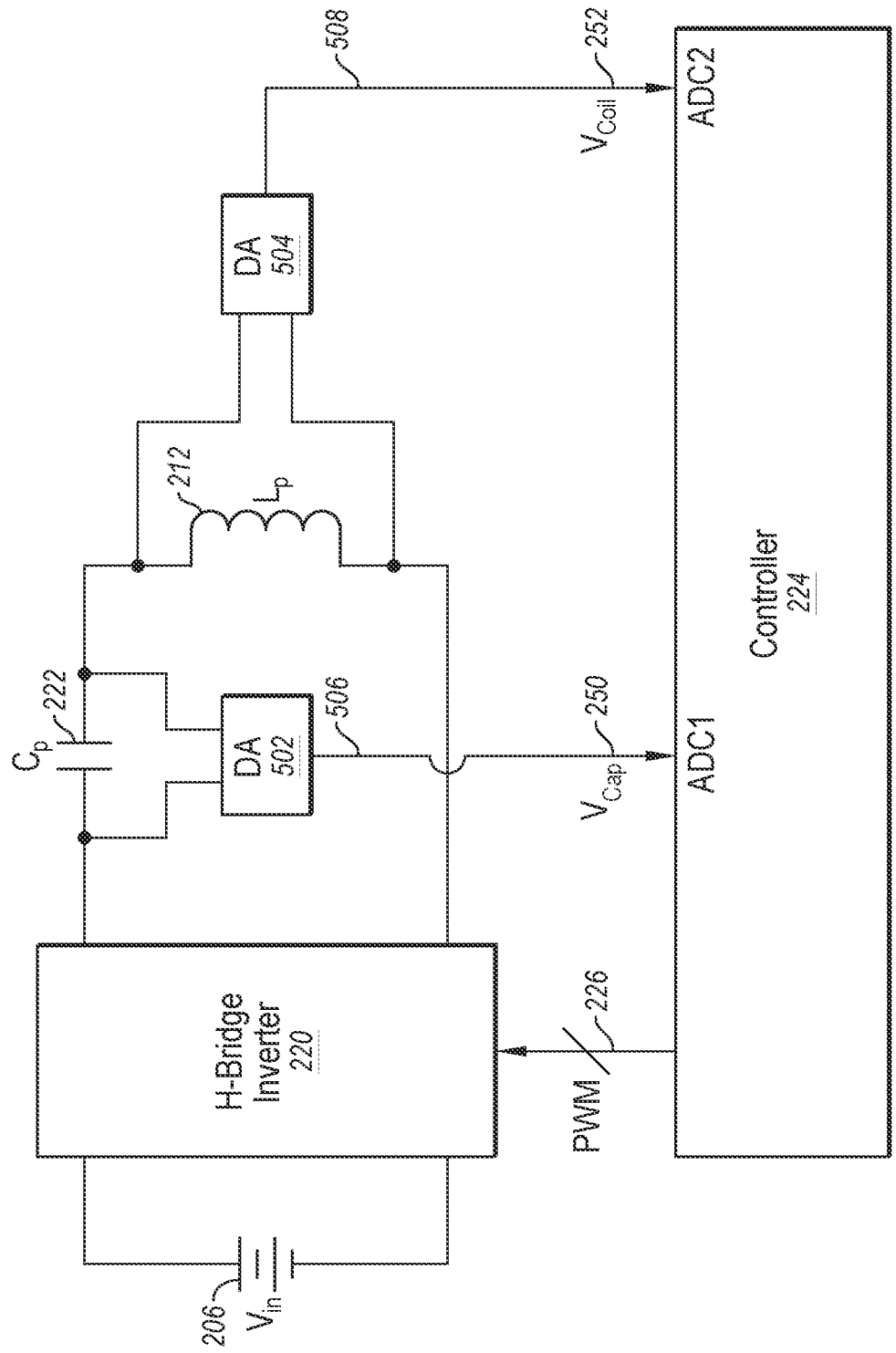
FIG. 5 is a circuit schematic diagram of a transmitter without a power filter, according to one or more examples.

FIG. 5 is a circuit schematic diagram of a transmitter 202C without a power filter, according to one or more examples. Transmitter 202C of FIG. 5 is similar to transmitter 202 of FIG. 2 and may be used as transmitter 202 of FIG. 2.

As described previously, controller 224 may compute a coil power of transmitter 202. The coil power may be utilized for computing a power loss for detection of a foreign object. For this purpose, controller 224 provides input 250 to a first ADC channel for sampling capacitor voltage across capacitor 222 ($C_p$). A coil current may be computed based on the sampled capacitor voltages. As capacitor 222 is coupled in series with transmitter coil 212, the current through capacitor 222 is the same as the coil current. A differential amplifier 502 is used to provide a capacitor measurement signal indicative of a capacitor voltage potential difference across capacitor 222. Differential amplifier 502 includes a first input terminal and a second input terminal electrically connected across capacitor 222, and an output 506 coupled to input 250 to the first ADC channel. In addition, controller 224 also provides input 252 to second ADC channel for sampling coil voltage across transmitter coil 212 ($L_p$). A differential amplifier 504 is used to provide a coil measurement signal indicative of a coil voltage potential difference across transmitter coil 212. Differential amplifier 504 includes a first input terminal and a second input terminal electrically connected across transmitter coil 212, and an output 508 coupled to input 252 to the second ADC channel.

The computation of the coil power based on the above-obtained signals is described in more detail below (e.g., FIGS. 8-12, FIG. 13). In one or more examples, transmitter 202C may determine whether a foreign object is present without use of a conventional current sensor to measure the current through transmitter coil 212 and/or to estimate losses in the transmitter.

Thus, two (2) dedicated ADCs capable of sampling the input at a very high rate are provided. By way of non-limiting example, around twenty (20) samples may be taken per cycle of 120 kHz, resulting in a sampling frequency of 2.4 MHz. The two dedicated ADCs may be triggered by the same signal, such that high frequency sampling may be performed simultaneously. In one or more examples, this ensures that sampling and processing delays are identical for both the signals.

Figure 6:
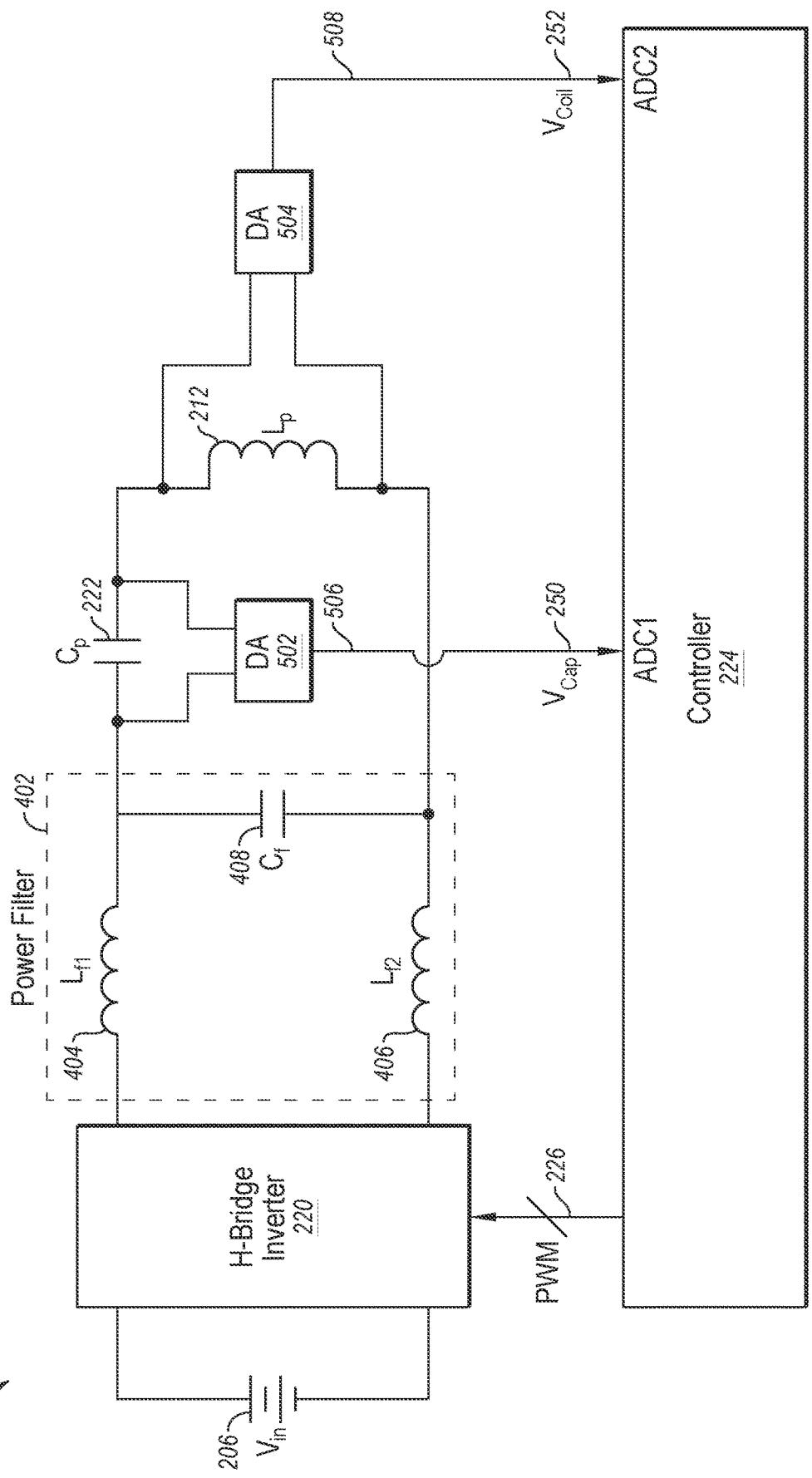
FIG. 6 is a circuit schematic diagram of a transmitter including a power filter, according to one or more examples.

FIG. 6 is a circuit schematic diagram of a transmitter 202D with power filter 402, according to one or more examples. Transmitter 202D of FIG. 6 is the same as the transmitter of FIG. 3 but includes power filter 402, as described in relation to FIG. 4. Transmitter 202D of FIG. 6 may be used as transmitter 202 of FIG. 2.

Figure 7A:
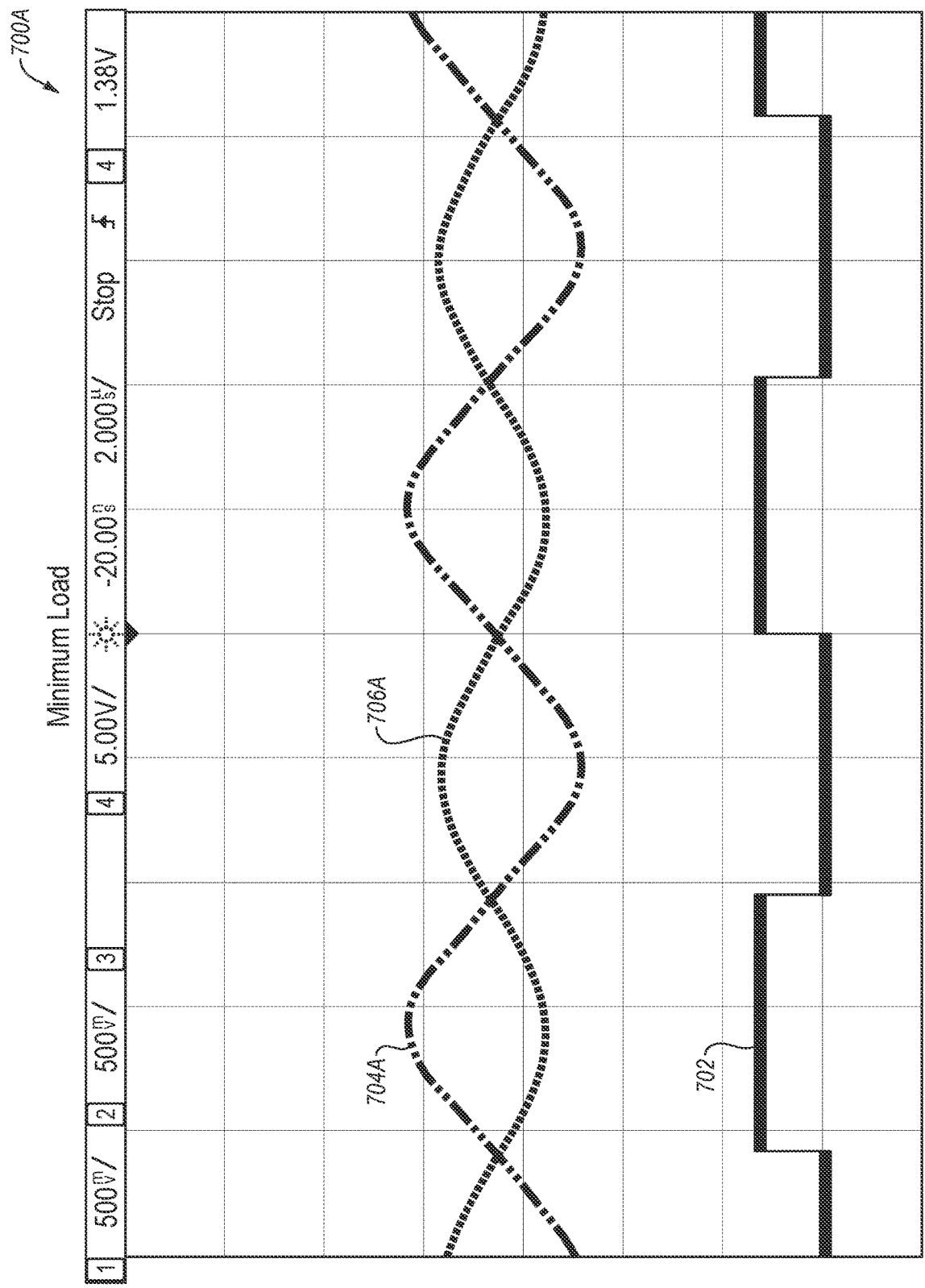
FIGS. 7A, 7B, and 7C are respective plots of capacitor and coil voltage waveforms for a receiver under multiple load conditions.
Figure 7B:
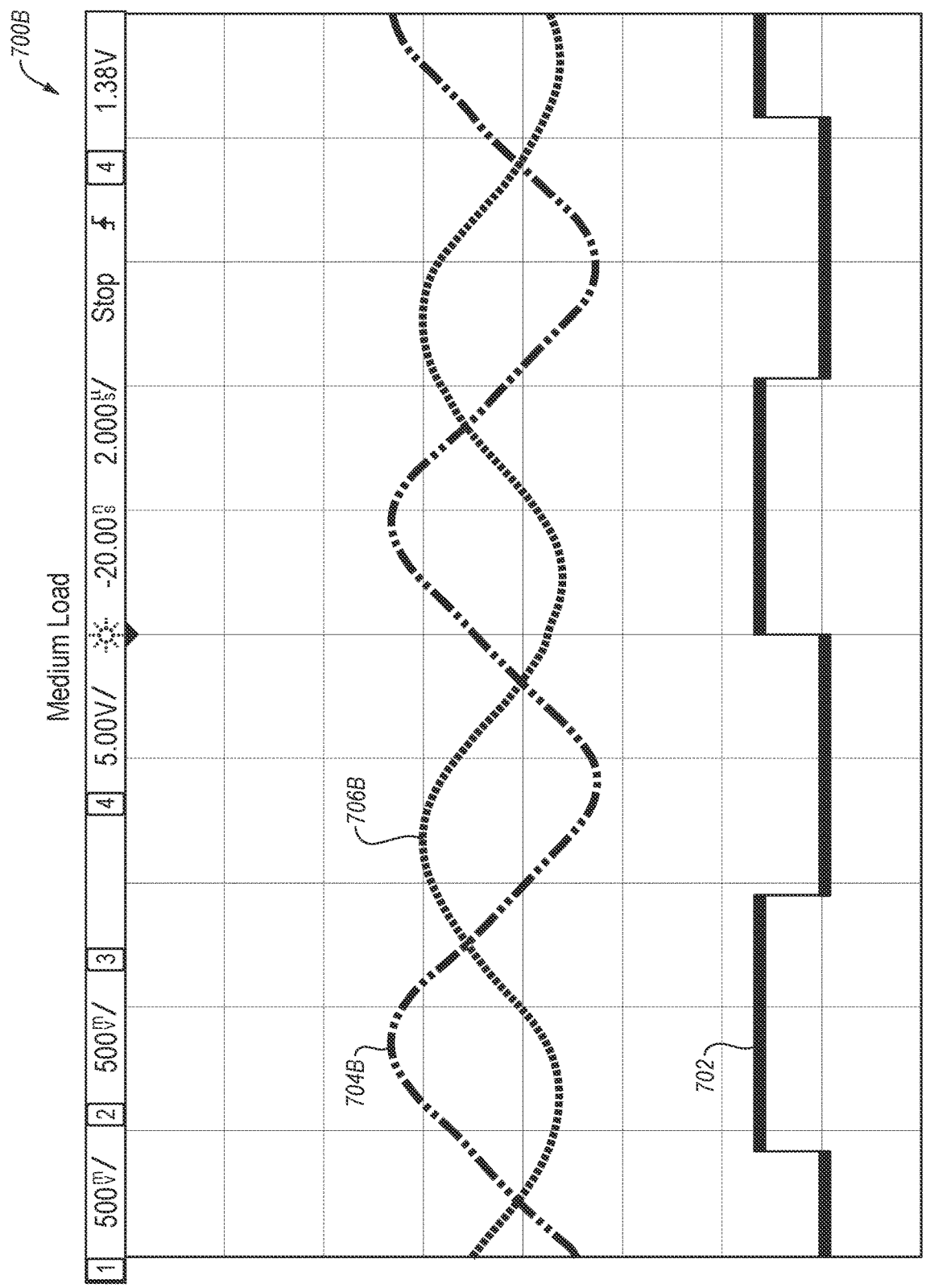
Figure 7C:
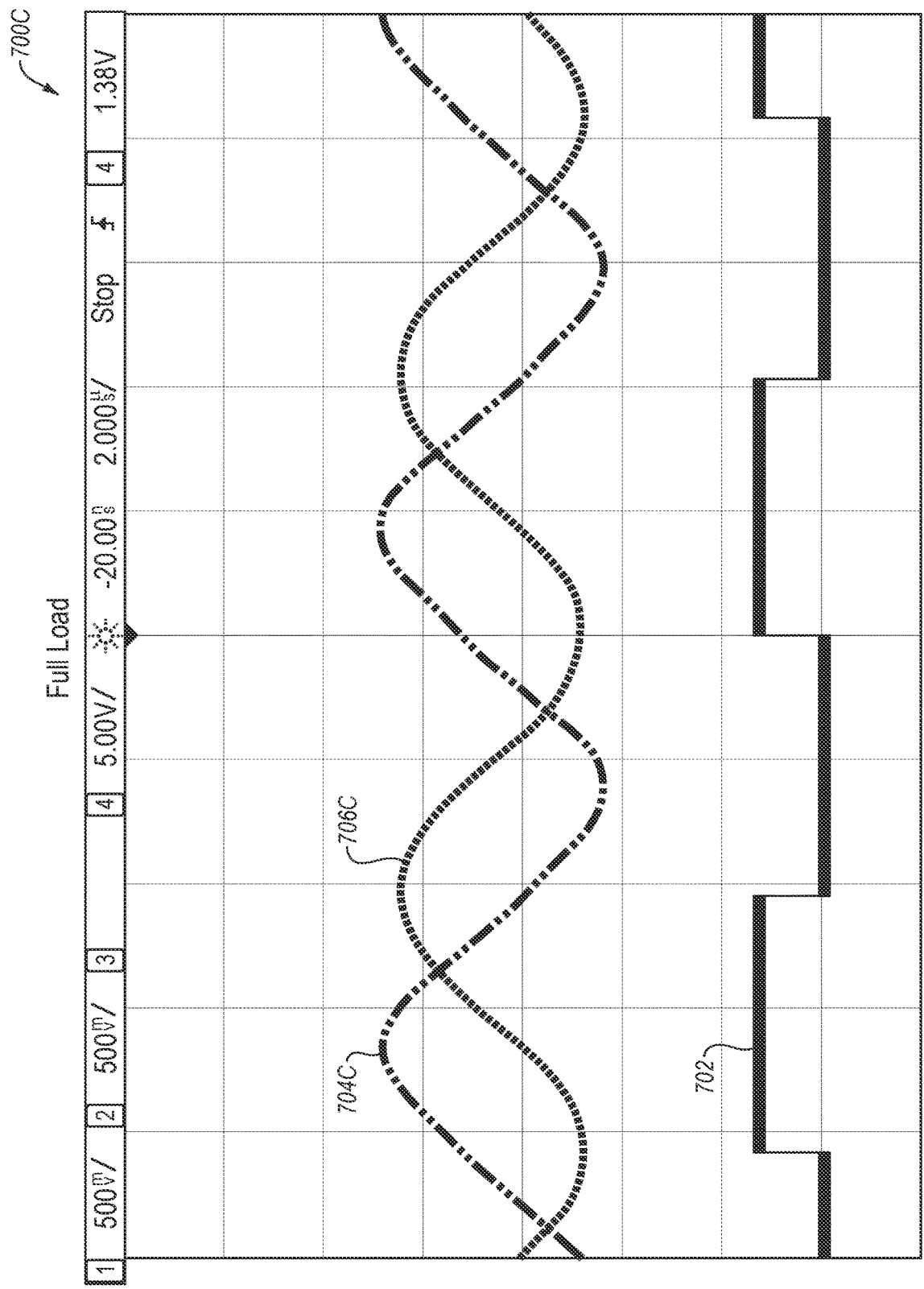

FIGS. 7A, 7B, and 7C are respective plots 700A, 700B, and 700C of the capacitor and coil voltage waveforms for a receiver under multiple load conditions. In respective plots 700A, 700B, 700C, the y-axis represents voltage potential and the x-axis represents time.

Plot 700A of FIG. 7A illustrates coil and capacitor voltage potential waveforms 704A and 706A, respectively, at a minimum load (0.75 W) on the receiver. A PWM signal 702 is also shown in relation to the coil and capacitor voltage potential waveforms 704A and 706A. Note that the two waveforms 704A and 706A are nearly out-of-phase (180 degree phase angle) with each other. The derivative of the capacitor voltage would produce a 90-degree phase angle, causing a large reactive power circulating in the LC components of the resonant tank circuit. The active power in this condition is close to zero (0), as the current and voltage across the coil would exhibit a 90 degree phase angle.

Plot 700B of FIG. 7B illustrates coil and capacitor voltage potential waveforms 704B and 706B, respectively, at a medium load (7.5 W) on the receiver. The medium load is about 50% of the rated load on the receiver. PWM signal 702 is also shown in relation to the coil and capacitor voltage potential waveforms 704B and 706B. Note that the phase angle of waveform 704B and 706B is less than 180 degrees, as observed in the "no load" or minimum load case. This causes a phase angle of about 60 degrees between coil voltage and coil current, and active power is supplied to the load. There is still a large circulating current resulting in the reactive power, which is not supplied to the load.

Plot 700C of FIG. 7C illustrates coil and capacitor voltage potential waveforms 704C and 706C, respectively, at a full load (15 W). PWM signal 702 is also shown in relation to the coil and capacitor voltage potential waveforms 704B and 706B. Note that the phase angle between waveforms 704C and 706C has been reduced (relative to the phase angle of waveforms 704B/706B and 704A/706A) and the amplitude of waveforms 704C and 706C has increased (relative to the amplitudes of waveforms 704B/706B and 704A/706A). This causes increased active power being supplied to the load. The phase angle between the coil voltage and current drops down further to about 45 degrees. In general, the maximum power is transferred when the phase angle between the coil voltage and current is zero (0). In theory, the phase angle between the coil voltage and current is zero can be zero (0) when the load is solely resistive. This is not a practicable possibility, however, as the receiver utilizes an inductive-resistive (LR) load.

FIGS. 8 through 12 are flowcharts of a detailed, end-to-end method of determining a coil power of a transmitter, according to one or more examples. In one or more examples, the end-to-end method may be performed by a controller (e.g., a microcontroller, such as a dsPIC microcontroller, without limitation) with use of a direct memory access (DMA) module. In one or more examples, the end-to-end method of determining the coil power may be for use in determining a power loss for foreign object detection.

Figure 8:
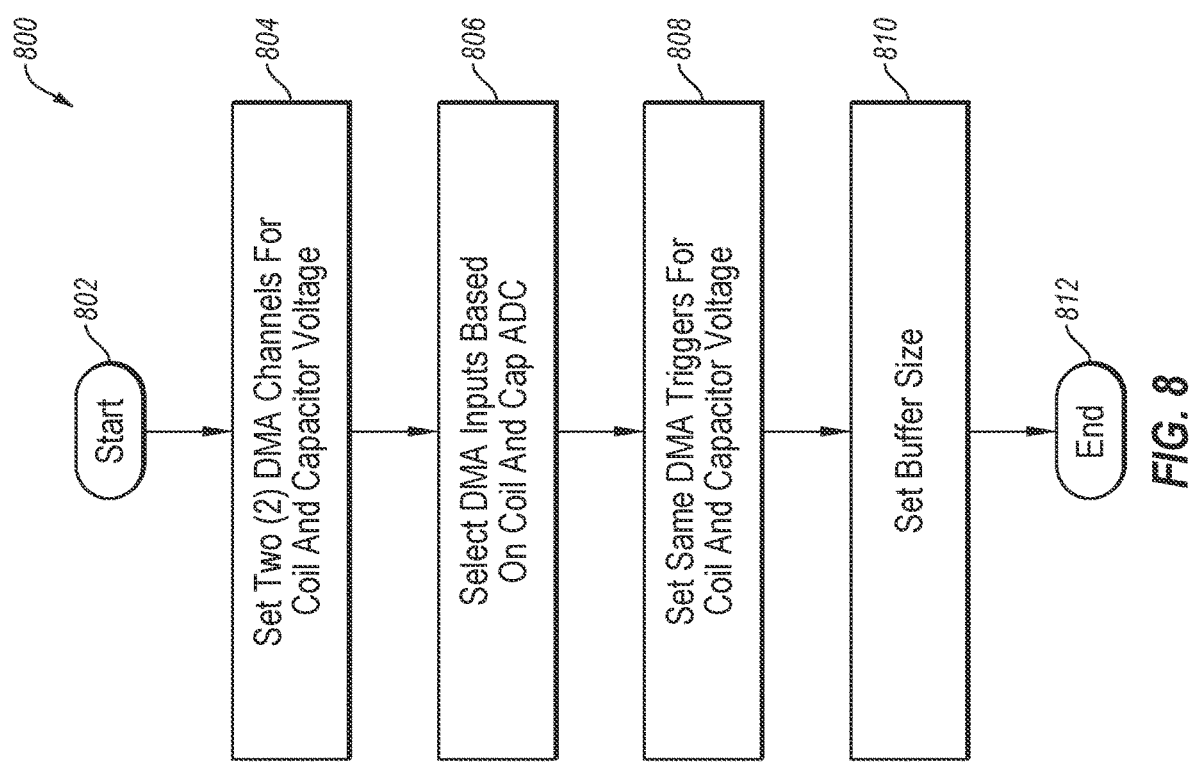

FIG. 8 is a flowchart illustrating a method 800 of performing a DMA initialization, according to one or more examples. Extensive data computation may be performed for the Qi functions. Since data is sampled at a very high frequency, a DMA module may be used to sample and store data independent of processor computational power.

Beginning at a start block 802 of FIG. 8, two (2) DMA channels are set for coil voltage and capacitor voltage, respectively (step 804 of FIG. 8). Two (2) DMA inputs are selected and associated with respective ADC channels for coil voltage ($V_{coil}$) and capacitor voltage ($V_{cap}$) (step 806 of FIG. 8). The same DMA trigger is set for both coil voltage and capacitor voltage (step 808 of FIG. 8). That is, both of the DMA channels are triggered by the same trigger source (e.g., a software trigger source). Buffers having buffer sizes are assigned to respective DMA channels for storing sampled data (step 810 of FIG. 8). In one or more examples, the buffer size may vary from a single cycle of size twenty (20) up to ten (10) cycles of size two-hundred (200). The flowchart of FIG. 8 ends at an end block 812.

Figure 9:
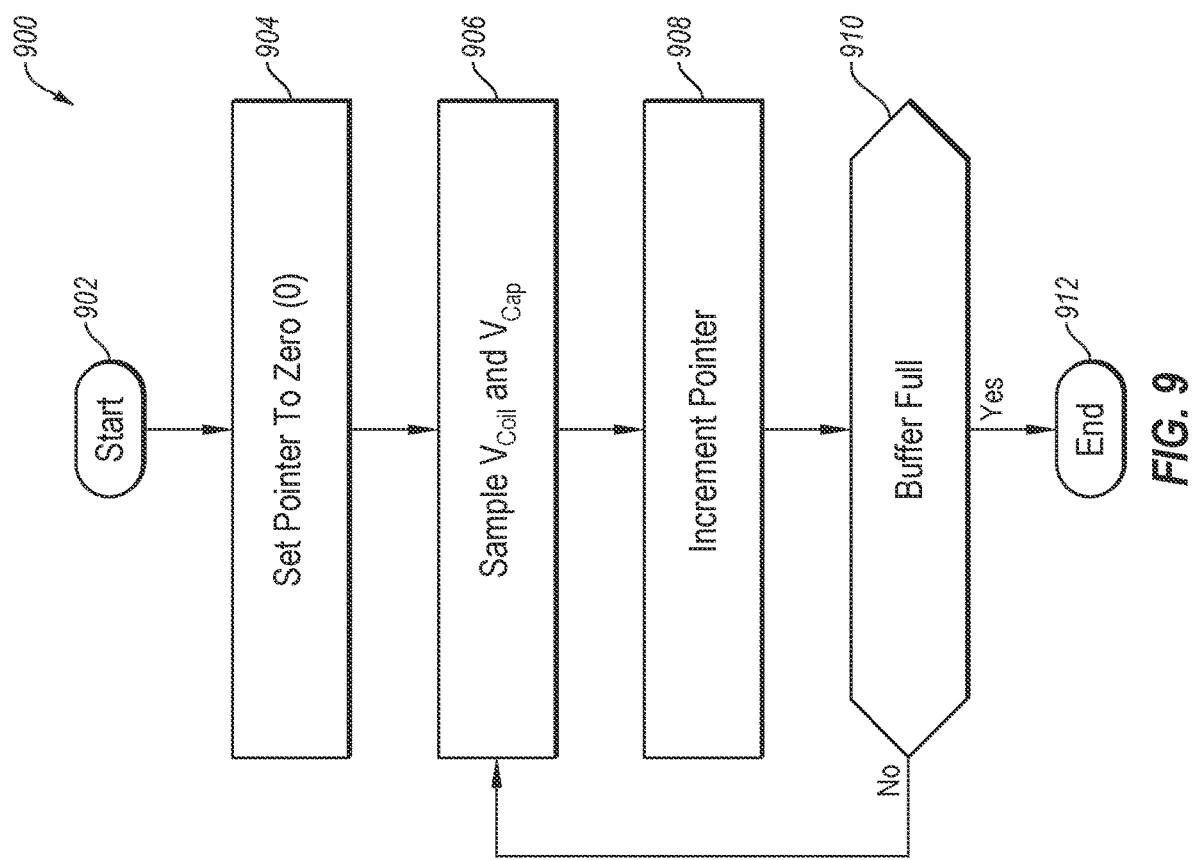

FIG. 9 is a flowchart illustrating a method 900 of performing a data acquisition process, according to one or more examples. In one or more examples, the data acquisition process may be a background DMA data acquisition process. In one or more examples, the method may be performed when a DMA channel is triggered by a software trigger.

Beginning at a start block 902 of FIG. 9, a pointer is set to zero (0) (step 904 of FIG. 9). The coil voltage ($V_{coil}$) and capacitor voltage ($V_{cap}$) are sampled via the two DMA/ADC channels (step 906 of FIG. 9). The pointer is then incremented (step 908 of FIG. 9). If the buffer is not yet full (as tested at step 910 of FIG. 9), steps 906 and 908 are repeated. Thus, the DMA module continuously triggers the ADC channels for coil voltage ($V_{coil}$) and capacitor voltage ($V_{cap}$) until the buffer is full. When the buffer is full, the flowchart of FIG. 9 ends at an end block 912. In one or more examples, when the buffer is full, the DMA module generates an interrupt for an interrupt service routine (ISR) (see, e.g., FIG. 10) when the buffer is full.

FIG. 10 is a flowchart illustrating a method 1000 of computing a coil current, a coil voltage, and a coil power, according to one or more examples. In one or more examples, the method of FIG. 10 may be the ISR described in relation to FIG. 9. In one or more examples, the data stored by the DMA module is worked on a sample-by-sample basis to compute the active power as follows.

Beginning at a start block 1002 of FIG. 10, a coil current ($I_{coil}$) is calculated based on the capacitor voltage ($V_{cap}$) (step 1004 of FIG. 10). A coil voltage ($V_{coil}$) is calculated for compensation of delay (step 1006 of FIG. 10). An active power (i.e., the coil power) is calculated based on the coil current ($I_{coil}$) and the coil voltage ($V_{coil}$). A power average is then computed over a time period (e.g., 1 ms, without limitation). The flowchart of FIG. 10 ends at an end block 1012.

The coil current may be calculated at every sample, except the first one. The coil current may be calculated or derived by differentiating the capacitor voltage based on the following expression, $$Icoil = C * \frac{dV_{cap}}{dt},$$

with the digital equivalent being $$Icoil = C * \frac{Vcap[i] - Vcap[i-1]}{Tsamp},$$

where C is the value of capacitor ($V_{cap}$) in Farads (F) and $T_{samp}$ is the sampling time in seconds. If the sampling period is fixed, the value of $C/T_{samp}$ may be pre-computed and used as a constant.

The computation of the coil current leads to an additional delay at every sample. To compensate for this delay, an averaging operation is performed on the coil voltage, such that the instances of the $I_{coil}$ and $V_{coil}$ are identical. The coil voltage (average) may be calculated or derived based on the following expression, $$Vcoil\_a = \frac{Vcoil[i] + Vcoil[i-1]}{2}.$$

In at least some or many instances, the power computation could be erroneous if this step is omitted.

FIG. 11 is a flowchart illustrating a method 1100 of performing a power loss calculation, according to one or more examples. Beginning at a start block 1102 of FIG. 11, a transmitter loss ($P_{tl}$) is calculated (step 1104 of FIG. 11). The active power ($P_{tx}$) is calculated (step 1106 of FIG. 11). A receiver power ($P_{rx}$) is obtained (step 1108 of FIG. 11). A power loss ($P_{loss}$) is calculated (step 1110 of FIG. 11). If the power loss ($P_{loss}$) is greater than a power threshold value ($P_{thresh}$) (step 1112 of FIG. 11), it may be determined that a foreign object is present (step 1114 of FIG. 11). The flowchart of FIG. 11 ends at an end block 1116.

The active power is computed over the entire interval by the dot product of the averaged $V_{coil\_a}$ and $I_{coil}$, $$Vcoil\_a = \frac{Vcoil[i] + Vcoil[i-1]}{2}.$$

The dot product is generally a scalar computation given by $$Ptx = \sum_{i=0}^{i=N-1} Vcoil\_a[i] * Icoil[i].$$

Figure 12:
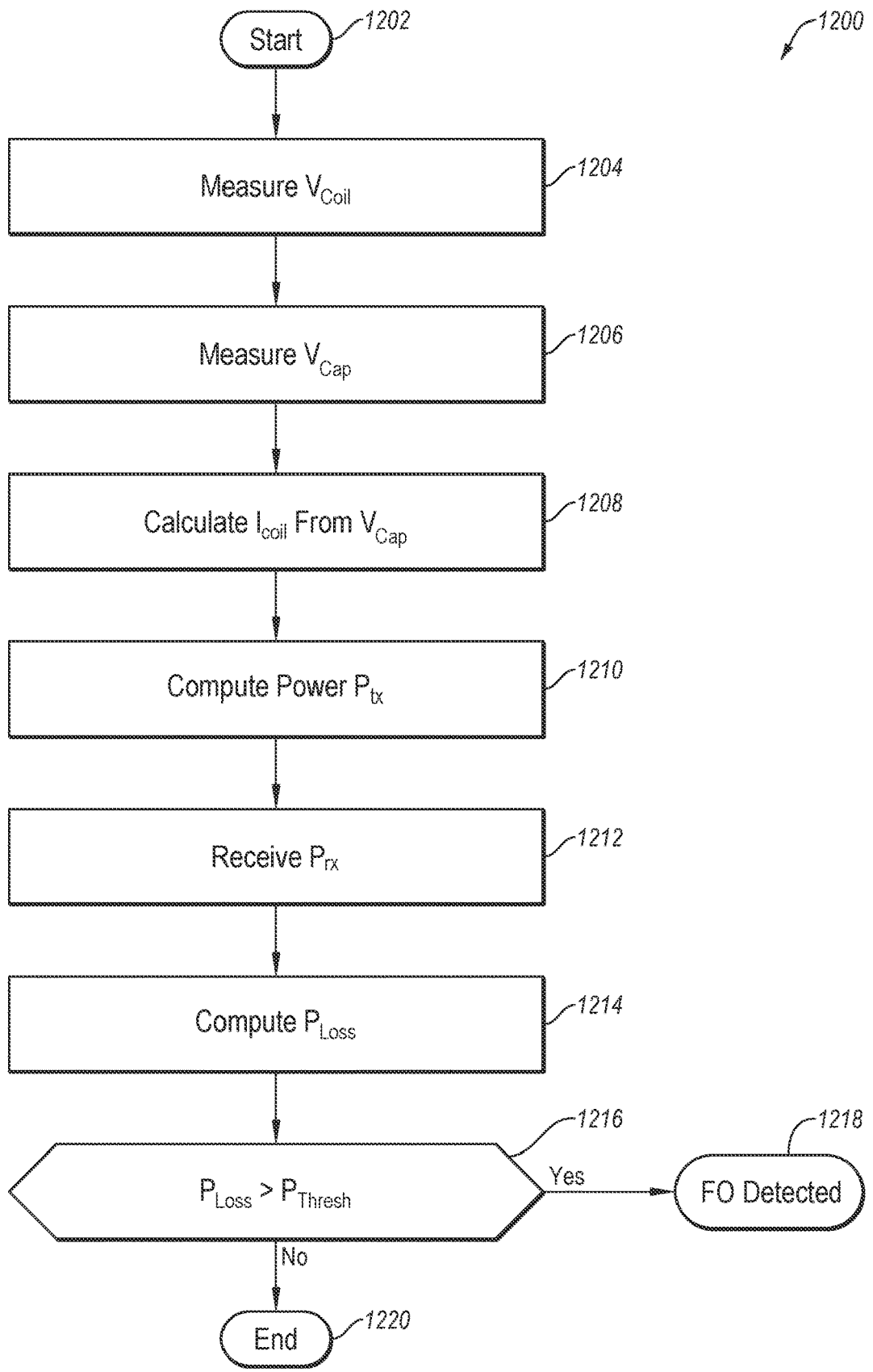

FIG. 12 is a flowchart illustrating a method 1200 of performing a power loss computation flowchart when a receiver is placed on a transmitter, according to one or more examples. The method 1200 begins at a start block 1202, where measuring or obtaining coil voltage ($V_{coil}$) in step 1204, capacitor voltage ($V_{cap}$) in step 1206, coil current ($I_{coil}$) in step 1208, and active power ($P_{tx}$) in step 1210 may be performed in the same or similar manner as described in relation to steps 1004, 1106, 1008, and 1010 of FIG. 10. Steps 1212, 1214, 1216, and 1218 may be performed in the same or similar manner as described in relation to FIG. 11. The flowchart of FIG. 12 ends at an end block 1220.

In relation to step 1210, the transmitter active power through the coil is computed using the equations given above. In relation to step 1212, the receiver sends the power it measured at its coil ($P_{rx}$) at the same instant. In relation to step 1214, the transmitter power loss is computed at a predetermined instance (e.g., typically every 1 ms in synchronization with the receiver). The power loss may be computed as $$P_{loss} = P_{tx} - P_{rx}.$$

If $P_{loss} > P_{thresh}$, it indicates presence of a foreign object between the transmitter and the receiver as the FO consumes power. If $P_{loss} < P_{thresh}$, then the power transmitted is received by the receiver.

Figure 13:
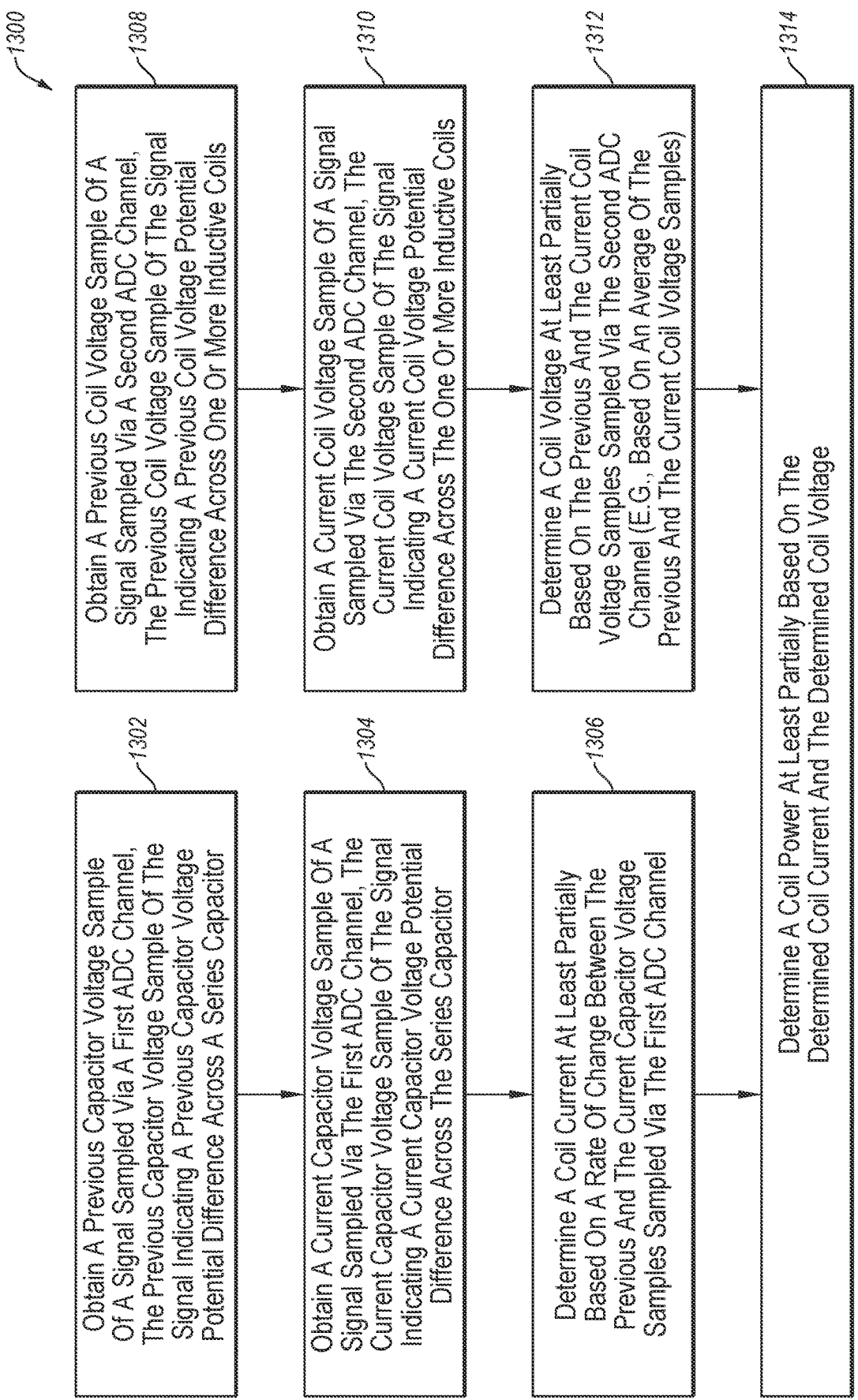
FIG. 13 is a flowchart for describing a method of determining a coil power of a transmitter, according to one or more examples.

FIG. 13 is a flowchart for describing a method 1300 of determining a coil power of a transmitter, according to one or more examples. In one or more examples, the coil power may be used to calculate power loss for detection of foreign objects. In one or more examples, the method may be performed by a controller of a transmitter having one or more inductive coils and a series capacitor electrically connected in series with the one or more inductive coils.

In FIG. 13, a previous capacitor voltage sample of a signal sampled via a first ADC channel is obtained (step 1302 of FIG. 13). The previous capacitor voltage sample of the signal indicates a previous capacitor voltage potential difference across the series capacitor. A current capacitor voltage sample of a signal sampled via the first ADC channel is then obtained (step 1304 of FIG. 13). The current capacitor voltage sample of the signal indicates a current capacitor voltage potential difference across the series capacitor. In one or more examples, the previous and the current capacitor voltage samples are consecutive samples. The coil current is determined at least partially based on a rate of change between the previous and the current capacitor voltage samples sampled via the first ADC channel (step 1306 of FIG. 13). In one or more specific examples of step 1306, the coil current is determined at least partially based on a ratio of a difference between the previous and the current capacitor voltage samples over a period of time between the previous and the current capacitor voltage samples.

In one or more examples, the following steps 1308 and 1310 are performed at substantially the same time as steps 1302 and 1304 just described. A previous coil voltage sample of a signal sampled via a second ADC channel is obtained (step 1308 of FIG. 13). The previous coil voltage sample of the signal indicates a previous coil voltage potential difference across the one or more inductive coils. A current coil voltage sample of a signal sampled via the second ADC channel is then obtained (step 1310 of FIG. 13). The current coil voltage sample of the signal indicates a current coil voltage potential difference across the one or more inductive coils. In one or more examples, the previous and the current coil voltage samples are consecutive samples. A coil voltage (e.g., average) is determined at least partially based on the previous and the current coil voltage samples (step 1312 of FIG. 13). In one or more examples of step 1312, the coil voltage potential difference is determined at least partially based on an average of the previous and the current coil voltage samples.

A coil power is then determined at least partially based on the determined coil current and the determined coil voltage (step 1314 of FIG. 13). In one or more examples, a power loss is determined at least partially based on the determined coil power and a received power indicated by a communication received from another inductive coil. In one or more examples, a foreign object is determined to be proximate to the one or more inductive coils responsive to a determination that the power loss exceeds a predetermined threshold value.

Thus, according to one or more specific examples, the coil voltage and the capacitor voltage may be sampled at (e.g., substantially) the exact same time using two (2) separate but identical channels. A coil current may be derived from the capacitor voltage, which may lead to a phase lag in the current channel as two (2) consecutive samples are required to compute the current value. In order to match the phase between the current and the voltage channels, the coil voltage is averaged with its previous value. Without such phase matching, the dot product computed may be inaccurate, which may lead to erroneous foreign object detection.

Figure 14:
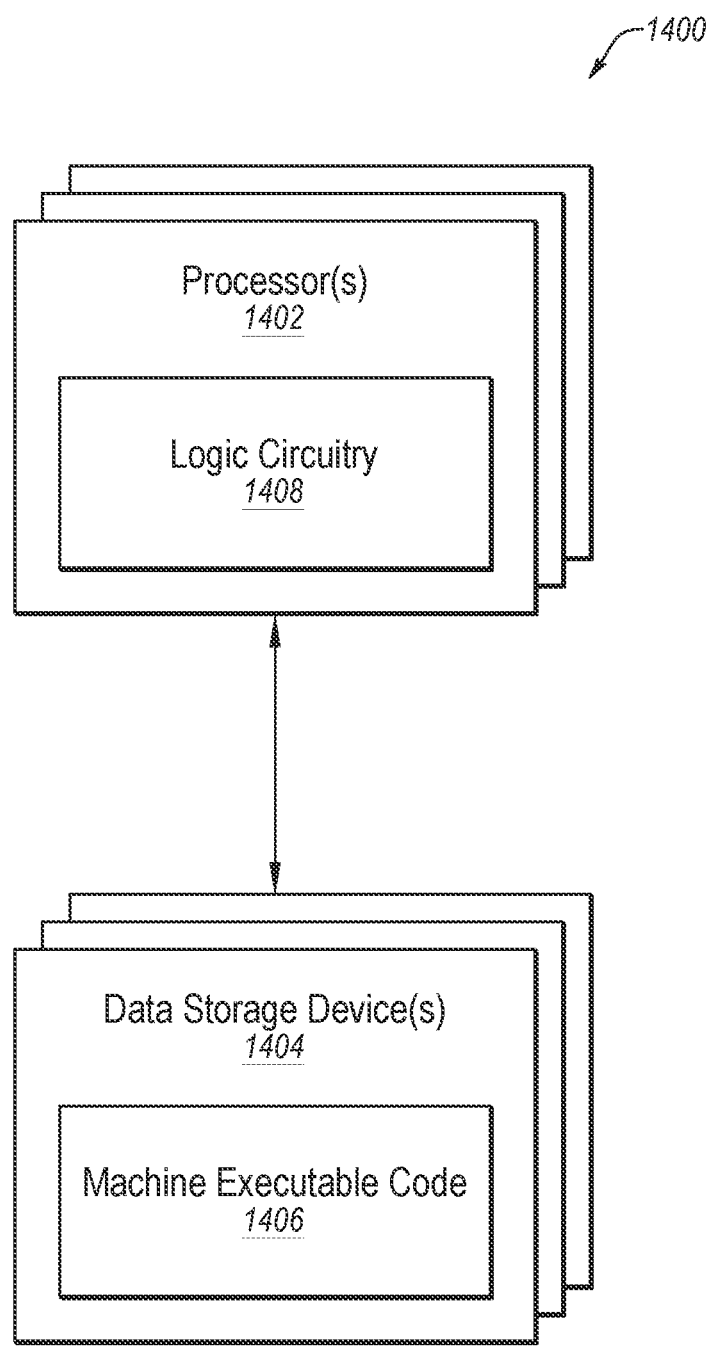
FIG. 14 is a block diagram of circuitry that, in some examples, may be used to implement various functions, operations, acts, processes, and/or methods disclosed herein.

It will be appreciated by those of ordinary skill in the art that functional elements of examples disclosed herein (e.g., functions, operations, acts, processes, and/or methods) may be implemented in any suitable hardware, software, firmware, or combinations thereof. FIG. 14 illustrates non-limiting examples of implementations of functional elements disclosed herein. In some examples, some or all portions of the functional elements disclosed herein may be performed by hardware specially implemented for carrying out the functional elements.

FIG. 14 is a block diagram of circuitry 1400 that, in some examples, may be used to implement various functions, operations, acts, processes, and/or methods disclosed herein. The circuitry 1400 includes one or more processors 1402 (sometimes referred to herein as "processors 1402") operably coupled to one or more data storage devices (sometimes referred to herein as "storage 1404"). The storage 1404 includes machine-executable code 1406 stored thereon and the processors 1402 include logic circuitry 1408. The machine-executable code 1406 includes information describing functional elements that may be implemented by (e.g., performed by) the logic circuitry 1408. The logic circuitry 1408 is adapted to implement (e.g., perform) the functional elements described by the machine-executable code 1406. The circuitry 1400, when executing the functional elements described by the machine-executable code 1406, should be considered as special purpose hardware for carrying out functional elements disclosed herein. In some examples the processors 1402 may be to perform the functional elements described by the machine-executable code 1406 sequentially, concurrently (e.g., on one or more different hardware platforms), or in one or more parallel process streams.

When implemented by logic circuitry 1408 of the processors 1402, the machine-executable code 1406 is to adapt the processors 1402 to perform operations of examples disclosed herein. For example, the machine-executable code 1406 may be to adapt the processors 1402 to perform at least a portion or a totality of the method 800 of FIG. 8, the method 900 of FIG. 9, the method 1000 of FIG. 10, the method 1100 of FIG. 11, the method 1200 of FIG. 12, and/or the method 1300 of FIG. 13. As another example, the machine-executable code 1406 may be to adapt the processors 1402 to perform at least a portion or a totality of the operations discussed for the controller of FIG. 2, the controller of FIG. 5, and/or the controller of FIG. 6. As a specific, non-limiting example, the machine-executable code 1406 may be to adapt the processors 1402 to determine a transmit power of one or more inductive coils responsive to a capacitor voltage potential difference across a series capacitor and a coil voltage potential difference across the one or more inductive coils. As another specific, non-limiting example, the machine-executable code 1406 may be to adapt the processors 1402 to determine a power loss by subtracting a receiver power indicated by a receiver from the transmit power, and compare the power loss to a predetermined threshold value to determine whether a foreign object is proximate to the one or more inductive coils.

The processors 1402 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is to execute functional elements corresponding to the machine-executable code 1406 (e.g., software code, firmware code, hardware descriptions) related to examples of the present disclosure. It is noted that a general-purpose processor (may also be referred to herein as a host processor or simply a host) may be a microprocessor, but in the alternative, the processors 1402 may include any conventional processor, controller, microcontroller, or state machine. The processors 1402 may also be implemented as a combination of computing devices, such as a combination of a DSP and a microprocessor, a plurality of microprocessors, one or more microprocessors in conjunction with a DSP core, or any other such configuration.

In some examples the storage 1404 includes volatile data storage (e.g., random-access memory (RAM)), non-volatile data storage (e.g., Flash memory, a hard disc drive, a solid state drive, erasable programmable read-only memory (EPROM), etc.). In some examples the processors 1402 and the storage 1404 may be implemented into a single device (e.g., a semiconductor device product, a system on chip (SOC), etc.). In some examples the processors 1402 and the storage 1404 may be implemented into separate devices.

In some examples the machine-executable code 1406 may include computer-readable instructions (e.g., software code, firmware code). By way of non-limiting example, the computer-readable instructions may be stored by the storage 1404, accessed directly by the processors 1402, and executed by the processors 1402 using at least the logic circuitry 1408. Also by way of non-limiting example, the computer-readable instructions may be stored on the storage 1404, transferred to a memory device (not shown) for execution, and executed by the processors 1402 using at least the logic circuitry 1408. Accordingly, in some examples the logic circuitry 1408 includes electrically configurable logic circuitry 1408.

In some examples the machine-executable code 1406 may describe hardware (e.g., circuitry) to be implemented in the logic circuitry 1408 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG™, SYS- TEMVERILOG™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 1408 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine-executable code 1406 may include an HDL, an RTL, a GL description, a mask level description, other hardware description, or any combination thereof.

In examples where the machine-executable code 1406 includes a hardware description (at any level of abstraction), a system (not shown, but including the storage 1404) may be to implement the hardware description described by the machine-executable code 1406. By way of non-limiting example, the processors 1402 may include a programmable logic device (e.g., an FPGA or a PLC) and the logic circuitry 1408 may be electrically controlled to implement circuitry corresponding to the hardware description into the logic circuitry 1408. Also by way of non-limiting example, the logic circuitry 1408 may include hard-wired logic manufactured by a manufacturing system (not shown, but including the storage 1404) according to the hardware description of the machine-executable code 1406.

Regardless of whether the machine-executable code 1406 includes computer-readable instructions or a hardware description, the logic circuitry 1408 is adapted to perform the functional elements described by the machine-executable code 1406 when implementing the functional elements of the machine-executable code 1406. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations to perform the actions of the module or component and/or software objects or software routines that may be stored on and/or executed by general purpose hardware (e.g., computer-readable media, processing devices, etc.) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc.," or "one or more of A, B, and C, etc.," is used, in general such a construction is intended to include A alone, B alone, C alone, A and B together, A and C together, B and C together, or A, B, and C together, etc.

Any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure include:

Example 1: An apparatus, comprising: one or more inductive coils to wirelessly couple with an other inductive coil; a series capacitor electrically connected in series with the one or more inductive coils; and a controller to: determine a coil current through the one or more inductive coils responsive to a capacitor voltage potential difference across the series capacitor; and determine a coil power responsive to the determined coil current and a coil voltage potential difference across the one or more inductive coils.

Example 2: The apparatus according to Example 1, wherein the controller is to determine a power loss responsive to the determined coil power and a received power indicated by a communication received from the other inductive coil.

Example 3: The apparatus according to any of Examples 1 and 2, wherein the controller is to determine that a foreign object is proximate to the one or more inductive coils responsive to a determination that the power loss exceeds a predetermined threshold value.

Example 4: The apparatus according to any of Examples 1 through 3, comprising a differential amplifier including a first input terminal and a second input terminal electrically connected across the series capacitor, the differential amplifier to provide a capacitor measurement signal indicative of the capacitor voltage potential difference to the controller.

Example 5: The apparatus according to any of Examples 1 through 4, comprising a differential amplifier including a first input terminal and a second input terminal electrically connected across the one or more inductive coils, the differential amplifier to provide a coil measurement signal indicative of the coil voltage potential difference to the controller.

Example 6: The apparatus according to any of Examples 1 through 5, wherein the controller is to determine the coil current responsive to a product between a capacitance of the series capacitor and a rate of change of the capacitor voltage potential difference.

Example 7: The apparatus according to any of Examples 1 through 6, wherein the controller is to determine the coil current responsive to a product between a capacitance of the series capacitor and a ratio of a difference between a current sample indicating the capacitor voltage potential difference and a previous sample indicating the capacitor voltage potential difference and a period of time between the current sample and the previous sample.

Example 8: The apparatus according to any of Examples 1 through 7, wherein the controller is to determine the coil voltage potential difference by averaging a current sample of the coil voltage potential difference with a previous sample of the coil voltage potential difference.

Example 9: The apparatus according to any of Examples 1 through 8, wherein the controller is to use direct memory access (DMA) to sample and store data indicative of the capacitor voltage potential difference and the coil voltage potential difference.

Example 10: The apparatus according to any of Examples 1 through 9, wherein the controller includes two DMA channels, a first of the two DMA channels for the capacitor voltage potential difference and a second of the two DMA channels for the coil voltage potential difference.

Example 11: A method comprising: at a controller of a transmitter including one or more inductive coils and a series capacitor electrically connected in series with the one or more inductive coils, determining a coil current at least partially based on a rate of change between previous and current capacitor voltage samples sampled via a first analog-to-digital converter (ADC) channel, the previous and the current capacitor voltage samples indicating previous and current capacitor voltage potential differences across the series capacitor; determining a coil voltage at least partially based on previous and current coil voltage samples sampled via a second ADC channel, the previous and the current coil voltage samples indicating previous and current coil voltage potential differences across the one or more inductive coils; and determining a coil power at least partially based on the determined coil current and the determined coil voltage.

Example 12: The method according to Example 11, wherein determining the coil voltage comprises determining the coil voltage at least partially based on an average of the previous and the current coil voltage samples.

Example 13: The method according to any of Examples 11 and 12, wherein determining the coil current is at least partially based on a ratio of a difference between the previous and the current capacitor voltage samples and a period of time between the previous and the current capacitor voltage samples.

Example 14: The method according to any of Examples 11 through 13, wherein the previous and the current capacitor voltage samples comprise consecutive samples, the previous and the current coil voltage samples comprise consecutive samples, and the previous and the current coil voltage samples are sampled at substantially the same time as the previous and the current capacitor voltage samples.

Example 15: The method according to any of Examples 11 through 14, wherein the one or more inductive coils is to wirelessly couple with an other inductive coil, the method comprising: at the controller, determining a power loss at least partially based on the determined coil power and a received power indicated by a communication received from the other inductive coil; and determining that a foreign object is proximate to the one or more inductive coils responsive to a determination that the power loss exceeds a predetermined threshold value.

Example 16: An apparatus, comprising: one or more inductive coils to wirelessly couple with an other inductive coil; a series capacitor electrically connected in series with the one or more inductive coils; and a controller to: determine a coil current at least partially based on a rate of change between previous and current capacitor voltage samples sampled via a first analog-to-digital converter (ADC) channel, the previous and the current capacitor voltage samples indicating previous and current capacitor voltage potential differences across the series capacitor; determine a coil voltage at least partially based on previous and current coil voltage samples sampled via a second ADC channel, the previous and the current coil voltage samples indicating previous and current coil voltage potential differences across the one or more inductive coils; and determine a coil power at least partially based on the determined coil current and the determined coil voltage.

Example 17: The apparatus according to Example 16, wherein the controller is to determine the coil voltage at least partially based on an average of the previous and the current coil voltage samples.

Example 18: The apparatus according to any of examples 16 and 17, wherein the controller is to determine the coil current based on a ratio of a difference between the previous and the current capacitor voltage samples and a period of time between the previous and the current capacitor voltage samples.

Example 19: The apparatus according to any of Examples 16 through 18, wherein the controller is to: determine a power loss at least partially based on the determined coil power and a received power indicated by a communication received from the other inductive coil.

Example 20: The apparatus according to any of Examples 16 through 19, wherein the controller is to: determining that a foreign object is proximate to the one or more inductive coils responsive to a determination that the power loss exceeds a predetermined threshold value.

Example 21: A method comprising: obtaining a previous capacitor voltage sample of a signal sampled via a first analog-to-digital converter (ADC) channel, the previous capacitor voltage sample of the signal indicating a previous capacitor voltage potential difference across a series capacitor electrically connected in series with one or more inductive coils of a transmitter for wireless power transmission; obtaining a current capacitor voltage sample of a signal sampled via the first ADC channel, the current capacitor voltage sample of the signal indicating a current capacitor voltage potential difference across the series capacitor; obtaining a previous coil voltage sample of a signal sampled via a second ADC channel, the previous coil voltage sample of the signal indicating a previous coil voltage potential difference across the one or more inductive coils; obtaining a current coil voltage sample of a signal sampled via the second ADC channel, the current coil voltage sample of the signal indicating a current coil voltage potential difference across the one or more inductive coils; determining a coil current at least partially based on a rate of change between the previous and the current capacitor voltage samples sampled via the first ADC channel; determining a coil voltage at least partially based on an average of the previous and the current coil voltage samples; and determining a coil power responsive to the determined coil current and the determined coil voltage.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. A method comprising:
at a controller adapted to control a transmitter including one or more inductive coils for wireless power transmission of wireless power to a receiver and a series capacitor electrically connected in series with the one or more inductive coils,
determining a coil current at least partially based on a determined rate of change between previous and current capacitor voltage samples sampled via a first analog-to-digital converter (ADC) channel, the previous and the current capacitor voltage samples indicative of previous and current capacitor voltage potential differences, respectively, across the series capacitor;
determining a coil voltage at least partially based on an average of previous and current coil voltage samples sampled via a second ADC channel, the determined average to compensate for a phase lag from determining the coil current, the previous and the current coil voltage samples indicative of previous and current coil voltage potential differences, respectively, across the one or more inductive coils, the previous and the current coil voltage samples sampled at substantially the same time as the previous and the current capacitor voltage samples, respectively;
determining a coil power at least partially based on the determined coil current and the determined coil voltage;
determining a power loss at least partially based on the determined coil power and a received power indicated in a communication received from the receiver; and
determining that a foreign object is proximate to the one or more inductive coils at least partially responsive to a determination that the power loss exceeds a predetermined threshold value.

2. The method of claim 1, wherein determining the coil current is at least partially based on a ratio of a difference between the previous and the current capacitor voltage samples and a period of time between the previous and the current capacitor voltage samples.

3. The method of claim 1, wherein the previous and the current capacitor voltage samples comprise consecutive samples, and the previous and the current coil voltage samples comprise consecutive samples.

4. The method of claim 1, comprising:
at the controller,
stopping the wireless power transmission of wireless power to the receiver at least partially responsive to the determination that the power loss exceeds the predetermined threshold value.

5. The method of claim 1, wherein determining the coil power comprises determining an active power based on a dot product of the determined coil current and the determined coil voltage.

6. An apparatus, comprising:
a transmitter including:
one or more inductive coils to wirelessly couple with an other inductive coil of a receiver for wireless power transmission of wireless power to the receiver;
a series capacitor electrically connected in series with the one or more inductive coils; and
a controller to:
determine a coil current at least partially based on a determined rate of change between previous and current capacitor voltage samples sampled via a first analog-to-digital converter (ADC) channel, the previous and the current capacitor voltage samples indicative of previous and current capacitor voltage potential differences, respectively, across the series capacitor;
determine a coil voltage at least partially based on an average of previous and current coil voltage samples sampled via a second ADC channel, the determined average to compensate for a phase lag from determining the coil current, the previous and the current coil voltage samples indicative of previous and current coil voltage potential differences, respectively, across the one or more inductive coils, the previous and the current coil voltage samples sampled at substantially the same time as the previous and the current capacitor voltage samples, respectively;
determine a coil power at least partially based on the determined coil current and the determined coil voltage;
determine a power loss at least partially based on the determined coil power and a received power indicated in a communication received from the receiver; and
stop the wireless power transmission of wireless power to the receiver at least partially responsive to a determination that the power loss exceeds a predetermined threshold value.

7. The apparatus of claim 6, wherein the controller is to determine the coil current based on a ratio of a difference between the previous and the current capacitor voltage samples and a period of time between the previous and the current capacitor voltage samples.

8. The apparatus of claim 6, wherein the previous and the current capacitor voltage samples comprise consecutive samples, and the previous and the current coil voltage samples comprise consecutive samples.

9. The apparatus of claim 6, wherein the controller is to:
determining that a foreign object is proximate to the one or more inductive coils at least partially responsive to the determination that the power loss exceeds the predetermined threshold value.

10. A method comprising:
at a transmitter including one or more inductive coils for wireless power transmission of wireless power to a receiver, obtaining a previous capacitor voltage sample of a signal sampled via a first analog-to-digital converter (ADC) channel, the previous capacitor voltage sample of the signal indicative of a previous capacitor voltage potential difference across a series capacitor electrically connected in series with the one or more inductive coils;

obtaining a current capacitor voltage sample of a signal sampled via the first ADC channel, the current capacitor voltage sample of the signal indicative of a current capacitor voltage potential difference across the series capacitor;

obtaining a previous coil voltage sample of a signal sampled via a second ADC channel, the previous coil voltage sample of the signal indicative of a previous coil voltage potential difference across the one or more inductive coils, the previous coil voltage sample sampled at substantially the same time as the previous capacitor voltage sample;

obtaining a current coil voltage sample of a signal sampled via the second ADC channel, the current coil voltage sample of the signal indicative of a current coil voltage potential difference across the one or more inductive coils, the current coil voltage sample sampled at substantially the same time as the current capacitor voltage sample;

determining a coil current at least partially based on a determined rate of change between the previous and the current capacitor voltage samples sampled via the first ADC channel;

determining a coil voltage at least partially based on an average of the previous and the current coil voltage samples, the determined average to compensate for a phase lag from determining the coil current;

determining a coil power at least partially based on the determined coil current and the determined coil voltage;

determining a power loss at least partially based on the determined coil power and a received power indicated in a communication received from the receiver; and stopping the wireless power transmission of wireless power to the receiver at least partially responsive to a determination that the power loss exceeds a predetermined threshold value.

11. The method of claim 10, wherein the previous and the current capacitor voltage samples comprise consecutive samples, and the previous and the current coil voltage samples comprise consecutive samples.

12. The method of claim 11, comprising:
determining that a foreign object is proximate to the one or more inductive coils responsive to the determination that the power loss exceeds the predetermined threshold value.

13. The method of claim 10, wherein determining the coil power comprises determining an active power based on a dot product of the determined coil current and the determined coil voltage.

* * * * *